United States Patent [19]

Titus et al.

[11] 3,848,155

[45] Nov. 12, 1974

[54] CRT LINEAR SWEEP CONTROL CIRCUIT

[75] Inventors: Robert J. Titus; William J. Kelly, both of Sauquoit, N.Y.

[73] Assignee: Cogar Corporation, Wappingers Falls, N.Y.

[22] Filed: Oct. 1, 1971

[21] Appl. No.: 185,540

[52] U.S. Cl. .............................................. 315/27 TD

[51] Int. Cl. .............................................. H01j 29/70

[58] Field of Search ......... 315/27 LC, 27 TD, 27 R, 315/27 GD

[56] References Cited

UNITED STATES PATENTS

| | | | |
|---|---|---|---|
| 2,440,786 | 5/1948 | Schade | 315/27 R |
| 3,310,705 | 3/1967 | Nicholson | 315/27 TD |
| 3,398,318 | 8/1968 | Bazin | 315/27 R |
| 3,659,141 | 4/1972 | Kubala | 315/27 TD |

*Primary Examiner*—Maynard R. Wilbur
*Assistant Examiner*—J. M. Potenza
*Attorney, Agent, or Firm*—Gottlieb, Rackman & Reisman

[57] ABSTRACT

A CRT linear sweep control circuit. A transistor switch is used in a conventional way to cause a sweep current to flow through a deflecting coil. An auxiliary ramp current is generated and injected into the coil toward the end of the sweep. The injected ramp current compensates for the non-linear nature of the main sweep current waveform toward the end of the sweep. The circuit for generating the additional ramp current is synchronized to the retrace pulses of the main sweep.

4 Claims, 4 Drawing Figures

Figure 1:
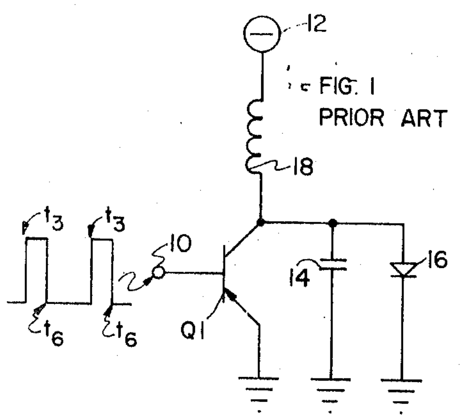
FIG. 1 PRIOR ART

INVENTORS
ROBERT J. TITUS
WILLIAM J. KELLY
BY Gottlieb, Rackman & Reisman
Harry M Weiss
ATTORNEYS

CRT LINEAR SWEEP CONTROL CIRCUIT

This invention relates to CRT sweep circuits and more particularly to circuits for linearizing CRT sweeps.

A conventional cathode ray tube (CRT) is provided with vertical and horizontal coils mounted on the neck of the tube for controlling horizontal and vertical sweeps of an electron beam in the tube. In certain systems, such as television receivers, the horizontal sweep is fast and the vertical sweep is slow; in other systems, such as some types of alpha-numeric displays, the fast sweep is in the vertical direction and the horizontal sweep is slow. In both cases, it is desirable that the two sweeps be linear. This requires the current through each coil to increase at a constant rate, in the form of a ramp, during the sweep. But it is difficult to achieve a linear sweep during the entire ramp current interval. For this reason, in many systems only the most linear (initial) portion of each sweep is used for the display; the trailing portion of the sweep signal deflects the electron beam outside the viewing area and non-linearities in the display which would otherwise be present are not seen. But in many display systems it is not possible to "waste" a substantial portion of each sweep in this manner. For this reason, where the entire sweep must be used, it has been the practice to incorporate relatively complex linearizing networks in the sweep circuits. Very often operational amplifiers are used for this purpose. Also, it is the practice in some systems to vary the battery voltage which controls the sweep current toward the end of each sweep.

It is a general object of our invention to provide a relatively simple circuit for linearizing a CRT sweep.

In accordance with the principles of our invention, in addition to the conventional sweep circuitry for controlling a linear, rising current through a deflection coil, we provide a circuit for injecting an additional current in the coil. The additional current is in the form of a ramp and is added to the main current controlled by the conventional sweep circuitry. The additional current begins to flow only toward the end of each sweep and rises linearly to a maximum value at the end of the sweep. The additional current compensates for the usual droop at the end of each sweep so that the total sweep current is linear all the way to the end of the sweep. The additional circuitry for injecting this current component is triggered by the retrace signal of the main sweep circuit. In this manner, there is no need for feedback circuits; the same retrace pulse which controls the main sweep current also synchronizes the additional injected current waveform to it.

It is a feature of our invention to inject an additional current component in the coil of a CRT sweep circuit to linearize the tail end of the sweep, the injected current being in the form of a ramp which begins well after the main sweep current and is synchronized to it by the sweep retrace pulses.

Figures 2A, 2B:
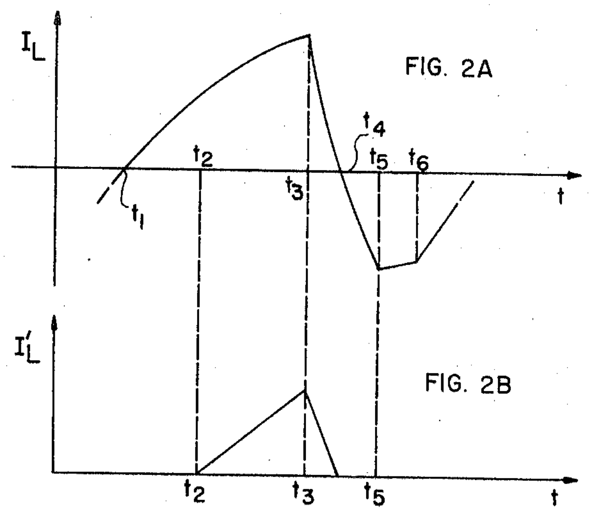
Figure 3:
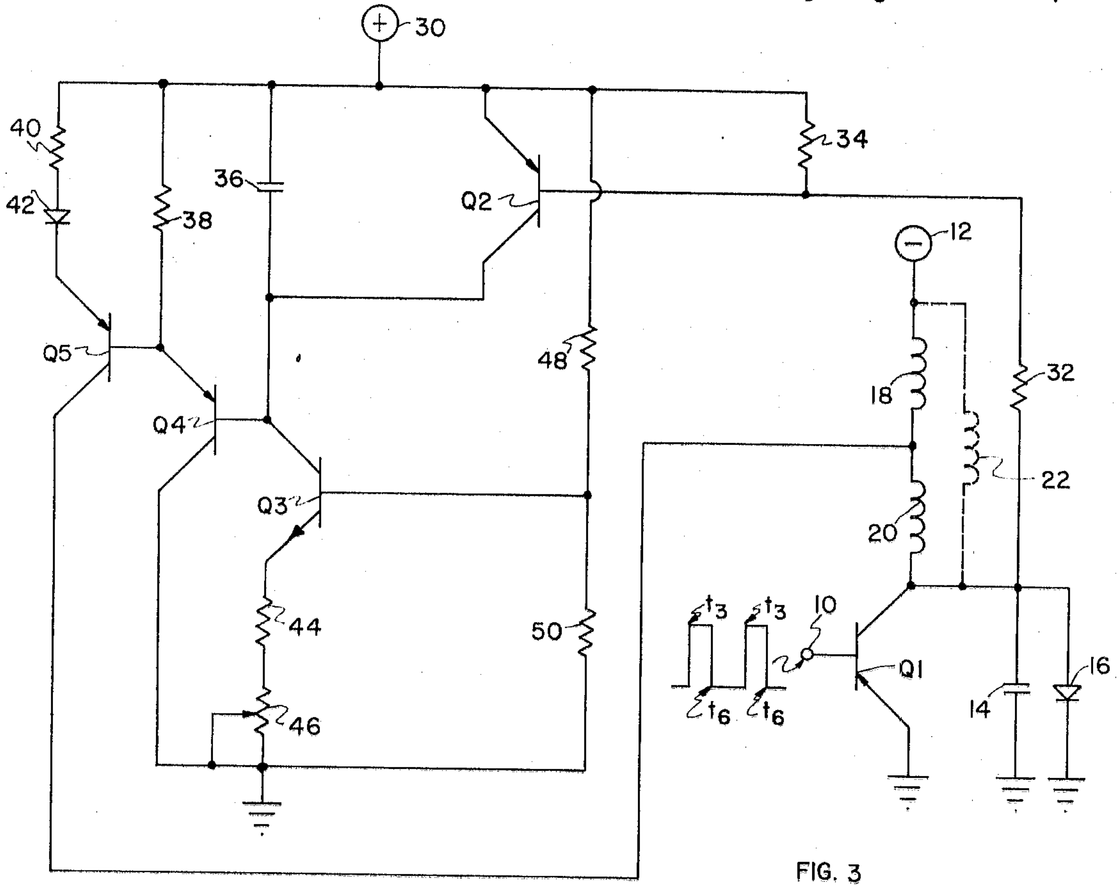

Further objects, features and advantages of our invention will become apparent upon consideration of the following detailed description in conjunction with the drawing, in which:

FIG. 1 depicts a typical prior art sweep circuit;

FIGS. 2A and 2B respectively illustrate the waveform of the sweep current generated by the circuit of FIG. 1 and the additional injected current component which is generated in accordance with the principles of the invention; and FIG. 3 depicts the illustrative embodiment of the invention.

In the conventional sweep circuit of FIG. 1, the sweep is controlled by the square-wave pulse signal applied to input terminal 10, connected to the base of transistor Q1. The input signal can be derived from any conventional pulse generator designed for this purpose, as is known in the art. The retrace begins at time $t_3$ and the sweep begins at time $t_6$. When the sweep is in progress, the base of transistor Q1 is negative and current flows from ground through the transistor and coil 18 to negative source 12. When the transistor first turns on at time $t_6$ a step voltage is applied across the coil. In such a case, the current through the coil increases linearly. As will become apparent below, the current through the coil just prior to the time when the transistor turns on is in the downward direction (negative) and the positive current which flows through the transistor when it turns on causes the negative current to decrease and the current to eventually reverse direction. At time $t_1$ the current reverses its direction and at time $t_3$ a maximum positive curflows through the coil. It should be noted that although the sweep is relatively linear immediately after time $t_1$, toward the end of the sweep the rate of rise of the current decreases so that the sweep current is not linear and droops slightly (see FIG. 2A).

At time $t_3$ the base of transistor Q1 goes positive and the transistor turns off. Capacitor 14 and coil 18 form a resonant circuit. The current which initially flows upward in coil 18 continues to flow in this direction but now flows through the capacitor rather than the transistor. As the current flows through the capacitor, the capacitor charges. At time $t_4$ the current reverses direction; at this time all of the energy in the circuit is in the form of stored charge in the capacitor, the junction of the coil and the capacitor being negative so that diode 16 is reverse biased. When the current reverses direction, the capacitor starts to discharge. Current flows from the capacitor to ground, through source 12 and coil 18. At time $t_4$ the current is at its maximum value in the reverse direction, the capacitor is discharged and the voltage across the capacitor is zero. At this time the current reverses direction once again. However, because diode 16 is no longer reverse biased, the current in coil 18 now flows through the diode and the capacitor is by-passed. The diode is provided so that the resonant circuit does not force the current to continue to reverse directions. The current which now flows through the coil and the diode decreases slightly between times $t_5$ and $t_6$ as a result of the inherent resistance of the diode and the coil. At time $t_6$ the transistor turns on once again. Although current is now flowing through the inductor in the downward direction, as soon as the transistor turns on it causes the reverse current to decrease and the coil current eventually changes direction at time $t_1$.

Ideally, when a step voltage of magnitude V is applied across a coil whose inductance is L, the coil current increases with time at a constant rate V/L. However, this assumes that the transistor is a perfect switch and that the coil is a pure inductance with no resistance component. In actual practice, the transistor switch and the coil do not have resistance values which can be ignored. If the combined resistance is R, then the coil current $I_L$ is defined by the following equation:

$$I_L = V/R(1-e^{-Rt/L})$$

If the exponential term in the equation is written in its series form, it is found that the current waveform is not exactly linear; instead, for large values of $t$, the current is less than the value $Vt/L$. For this reason, in many systems the actual portion of the sweep which is used for the display is that between time $t_1$ and a time substantially before time $t_3$. The non-linear part of the sweep is not used. Alternatively, feedback circuits can be employed to linearize the tail end of the sweep.

The illustrative embodiment of the invention is shown in FIG. 3. The basic sweep circuit of FIG. 1 is modified by the addition of inductor 20, the collector of transistor Q5 being connected to the junction of coil 18 and inductor 20. It is transistor Q5 which injects an additional current ramp into coil 18. The potential at the junction of diode 16 and capacitor 14 is extended through resistor 32 to the base of transistor Q2 for controlling the generation of the ramp current. FIG. 2A shows the main sweep current $I_L$ which is generated by the circuit of FIG. 1, and FIG. 2B shows the injected ramp current $I_L'$. (The current waveform is shown exaggerated in FIG. 2B). The actual current which flows through inductor 18 is the sum of the currents $I_L$ and $I_L'$. The ramp current begins at time $t_2$ — approximately at the time when the main sweep current starts to become nonlinear. The sum of the two currents provides an essentially linear current in the coil between times $t_1$ and $t_3$.

During the sweep, the voltage across capacitor 14 is equal to the collector-emitter drop of transistor Q1. The collector potential is slightly negative and prevents diode 16 from conducting. The junction of resistors 32 and 34 is sufficiently positive to reverse bias the emitter-base junction of transistor Q2. At the start of the retrace, however, as current flows into the capacitor it becomes negatively charged and the voltage at the junction of resistors 32 and 34 drops. At this time transistor Q2 is forward biased. The conduction of transistor Q2 causes capacitor 36 to discharge through it. During the retrace, the voltage across capacitor 14 increases (it is a maximum at time $t_4$) and then decreases. At time $t_5$ the capacitor is clamped through diode 16 to ground, and transistor Q2 turns off. Thus at the start of the sweep, capacitor 36 can once again charge.

Transistor Q3 is biased on by current flowing through resistors 48 and 50 from source 30. The transistor conducts and current flows from the source through capacitor 36, transistor Q3, resistor 44 and potentiometer 46. Transistor Q3 functions as a constant current source to supply a current whose magnitude is determined by the setting of the tap of the potentiometer. As current flows through capacitor 36 it charges, and when the capacitor voltage exceeds the sum of the junction drops of diode 42, and transistors Q5 and Q4, all three of these elements conduct. Resistors 38 and 40 are current limiting resistors for transistors Q4 and Q5. The voltage across capacitor 36 continues to increase linearly. The voltage at the base of transistor Q5 is equal to the voltage at the junction of the collector of transistor Q3 and capacitor 36, less the relatively constant emitter-base drop across transistor Q4. As the capacitor continues to charge the base voltage of transistor Q5 continues to increase linearly. This results in a linearly increasing current flow through transistor Q5.

Since the collector of transistor Q5 is connected to the junction of coils 18 and 20, the ramp current supplied by transistor Q5 flows through coil 18 into source 12. The current starts to flow at time $t_2$, which time is determined by the time required for capacitor 36 to charge sufficiently to turn on transistors Q4 and Q5. The rate of rise of the ramp current is determined by the setting of potentiometer 46, that is, the rate at which the base voltage of transistor Q5 increases. The ramp current continues to increase until just after time $t_3$ when capacitor 14 starts to charge, thereby turning on transistor Q2 and discharging capacitor 36. The capacitor discharges rapidly and does not begin to charge once again until the start of the sweep when transistor Q1 turns on. In this manner the ramp current is synchronized to the main sweep current because it is the retrace pulse during each sweep cycle that initiates the ramp current timing.

It should be noted that the collector of transistor Q5 is not connected to the junction of the collector of transistor Q1 and coil 18. Instead, an additional inductor 20 is placed in the circuit and the collector of transistor Q5 is connected to the junction of coils 18 and 20. Were inductor 20 not included in the circuit and the ramp current to flow into coil 18, a step voltage would appear across the coil because the voltage across an inductor is equal to the value of the inductance multiplied by the derivative of the current through it; in the case of a ramp current, the induced voltage is constant. The voltage step would have a polarity such that the end of the coil connected to the collector of transistor Q1 would go positive. This, in turn, would forward bias diode 16. The main current through transistor Q1 would then simply flow through the diode rather than the coil. Inductor 20 provides the isolation required to prevent the turning on of diode 16. With inductor 20 included in the circuit, it would appear that the injected current could divide with some of it flowing through coil 18 and some of it flowing through coil 20. However, if any of the current does flow through coil 20, the voltage which is induced across the coil is such that the junction of the coils goes positive in potential. (A downward flow of current through coil 20 causes the top of the coil to become positive relative to the bottom of the coil). Since the top of coil 18 is connected to negative source 12, an increase in the potential at the bottom of coil 18 results in a step increase of voltage across the coil. A step voltage across a coil causes a ramp current to flow through it, the current in the case of coil 18 being in the upward direction. Thus even were some of the injected current to flow through coil 20, it would necessarily result in an increase in the current flow through coil 18. Since the current through coil 18 can only be derived from transistor Q1 and the injected current, it is apparent that most of the injected current flows through coil 18.

An inductor 20 is used, rather than a resistor, because a resistor would degrade the linearity of the sweep. It is resistance in the path of the main sweep current that causes the current to be non-linear in the first place. Were a resistor substituted for inductor 20, the resulting degradation in the linearity of the main sweep current might be even greater than the improvement which can be provided by the injected ramp current.

With inductor 20 added to the circuit, the system timing is necessarily different from the timing of the system of FIG. 1. Of course, a suitable deflecting coil 18 can be used which takes into account the additional inductance of inductor 20. But if the circuit of the invention is added to a conventional sweep circuit, then the value of the total inductance in the circuit will be greater than that for which the circuit was designed. For this reason, an additional inductance 22, shown in phantom in FIG. 3, can be placed in the circuit in parallel with the series connection of coils 18 and 20. The additional inductor 22 lowers the overall inductance seen at the collector of transistor Q1 to that seen by the collector in the circuit of FIG. 1. Thus the system timing is unaffected at the same time that the linearity of the sweep is improved, even though a standard deflecting coil 18 is utilized.

Not only does the circuit of FIG. 3 linearize the sweep current, it does so without the provision of complex feedback circuits. The circuit for generating the injected ramp current is triggered by the retrace pulses of the main sweep current generator. Each retrace pulse causes capacitor 36 to discharge, and it is only at the start of the sweep that the capacitor starts to charge once again. Since it is the start of the charging of the capacitor that determines when the additional ramp current starts to flow during each sweep cycle, it is apparent that the injected ramp waveform is synchronized to the main sweep. This greatly contributes to the relatively low cost of the circuit.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A sweep circuit for causing a linear sweep current to flow through a deflecting coil comprising means for applying a step voltage across said coil to initiate each sweep waveform, the main sweep current which flows through the coil responsive to the application of said step voltage being non-linear toward the end of the sweep waveform as a result of resistance in the coil circuit, and means for generating a ramp current and injecting it into said coil in the same direction as said main sweep current during each sweep waveform starting at a time when the main sweep current tends to become substantially non-linear such that the total current through said coil during each complete sweep rises substantially linearly, further including means for generating retrace pulses, means for initiating the operation of said ramp current generating means responsive to the generation of a retrace pulse, means for delaying the generation of said ramp current after the initiation of the operation of said ramp generating means for a substantial time interval after the start of each main sweep current waveform until said main sweep current waveform tends to become substantially non-linear.

2. A sweep circuit in accordance with claim 1 further including inductor means connected in series with said deflecting coil, said ramp generating means being connected to the junction of said inductor means and said deflecting coil.

3. A sweep circuit in accordance with claim 1 wherein said ramp generating means includes means for synchronizing the operation thereof to the main sweep current waveform, further including means for delaying the generation of said ramp current for a substantial time interval after the start of each main sweep current waveform until said main sweep current waveform tends to become substantially non-linear.

4. A sweep circuit in accordance with claim 3 further including inductor means connected in series with said deflecting coil, said ramp current generating means being connected to the junction of said inductor means and said deflecting coil.

* * * * *